United States Patent [19]

Duesler et al.

[11] Patent Number: 5,249,417
[45] Date of Patent: Oct. 5, 1993

[54] METHOD AND APPARATUS TO INSTALL AND REMOVE HEAVY COMPONENTS

[75] Inventors: Paul W. Duesler, Manchester; Frank B. Manning, Vernon, both of Conn.

[73] Assignee: United Technologies Corporation, Hartford, Conn.

[21] Appl. No.: 766,610

[22] Filed: Sep. 25, 1991

[51] Int. Cl.⁵ .......................... F02C 7/20; F02G 3/00
[52] U.S. Cl. .................. 60/39.02; 60/39.31; 248/596; 248/618
[58] Field of Search ............... 60/39.02, 39.31, 39.33; 248/596, 618, 638, 624; 244/54

[56] References Cited

U.S. PATENT DOCUMENTS

| | | | |
|---|---|---|---|
| 1,131,487 | 3/1915 | Dodd | 248/618 |
| 2,354,445 | 7/1944 | Grubbs | 248/596 |
| 2,630,991 | 3/1953 | Long | 248/596 |
| 2,750,142 | 6/1956 | McKee | 248/216 |
| 3,269,118 | 8/1966 | Benedict et al. | 60/39.31 |
| 3,835,623 | 9/1974 | Kline | 55/148 |
| 4,342,439 | 8/1982 | Bruner | 248/544 |
| 4,683,520 | 7/1987 | Grassens et al. | 248/618 |
| 5,031,396 | 7/1991 | Margnelli | 60/39.31 |
| 5,040,764 | 8/1991 | Dubois | 248/638 |
| 5,126,607 | 6/1992 | Merriman, Jr. | 248/638 |

Primary Examiner—Richard A. Bertsch
Assistant Examiner—Howard R. Richman

[57] ABSTRACT

A method and apparatus to install and remove heavy components mounted on a base structure is disclosed. Various construction details are developed which provide means for coupling the component and base structure in a manner permitting relative rotation and translation about an axis of rotation. In one embodiment, an aircraft engine component (18) has a pair of hooks (32) and an aircraft engine (10) has a pair of pins (46) which engage the hooks to couple the component and engine to permit rotational and translational motion of the component relative to the engine. For this embodiment, a method for relative motion between an installed and uninstalled condition is comprised of maneuvering the component and engine between a coupled and uncoupled position, moving the coupled component relative to the engine about the axis of rotation, and manipulating a fastener means between a secured and unsecured position.

20 Claims, 3 Drawing Sheets

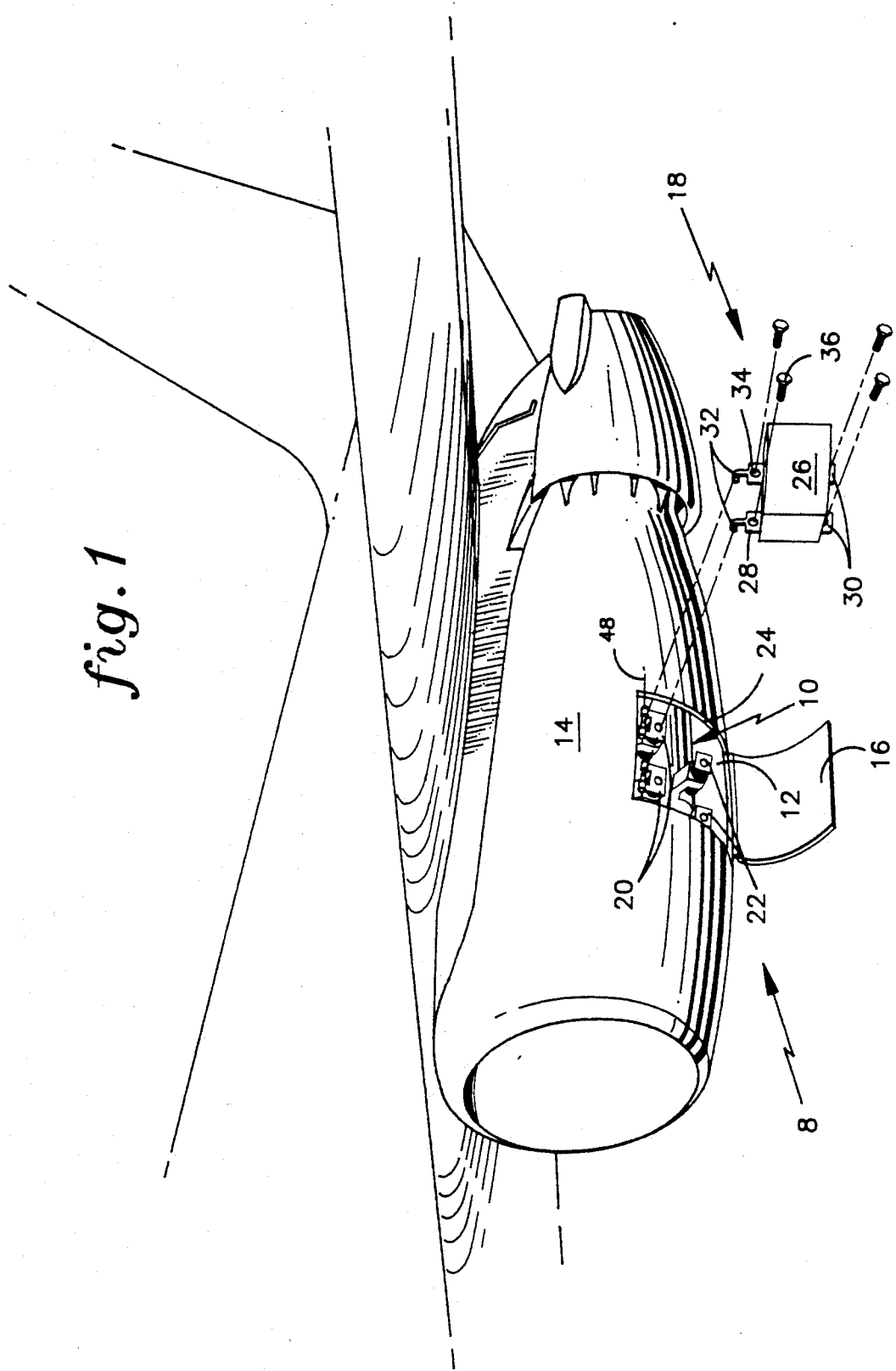

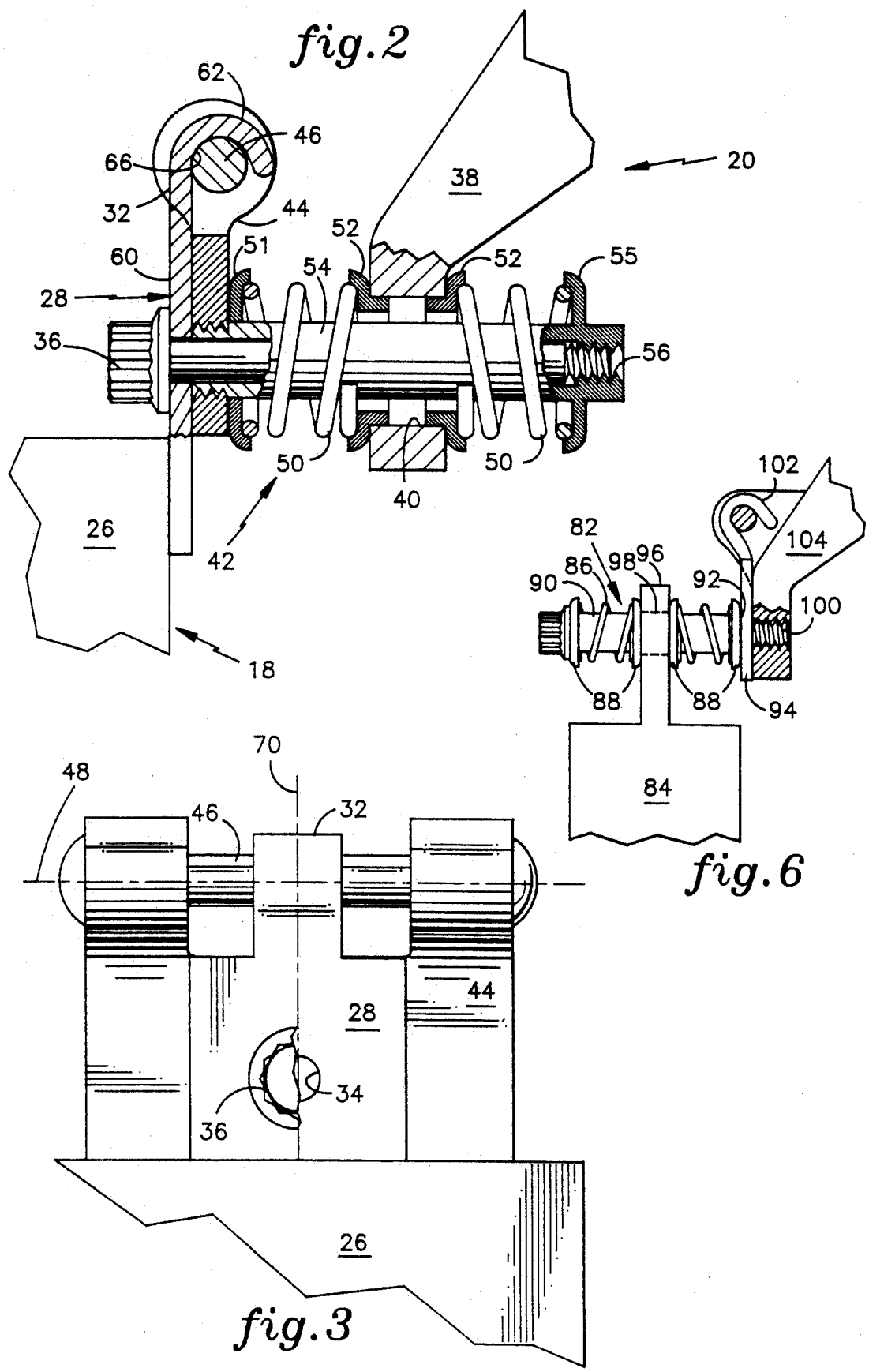

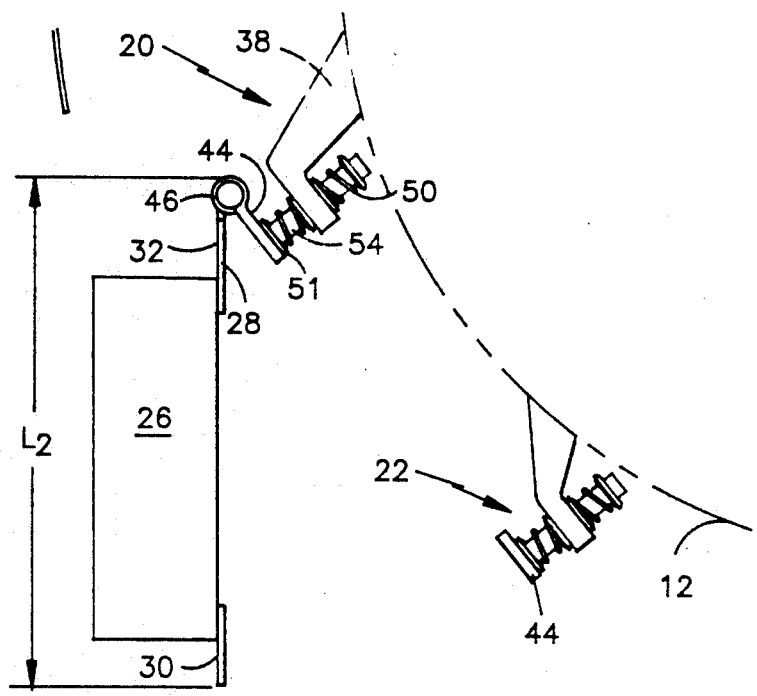
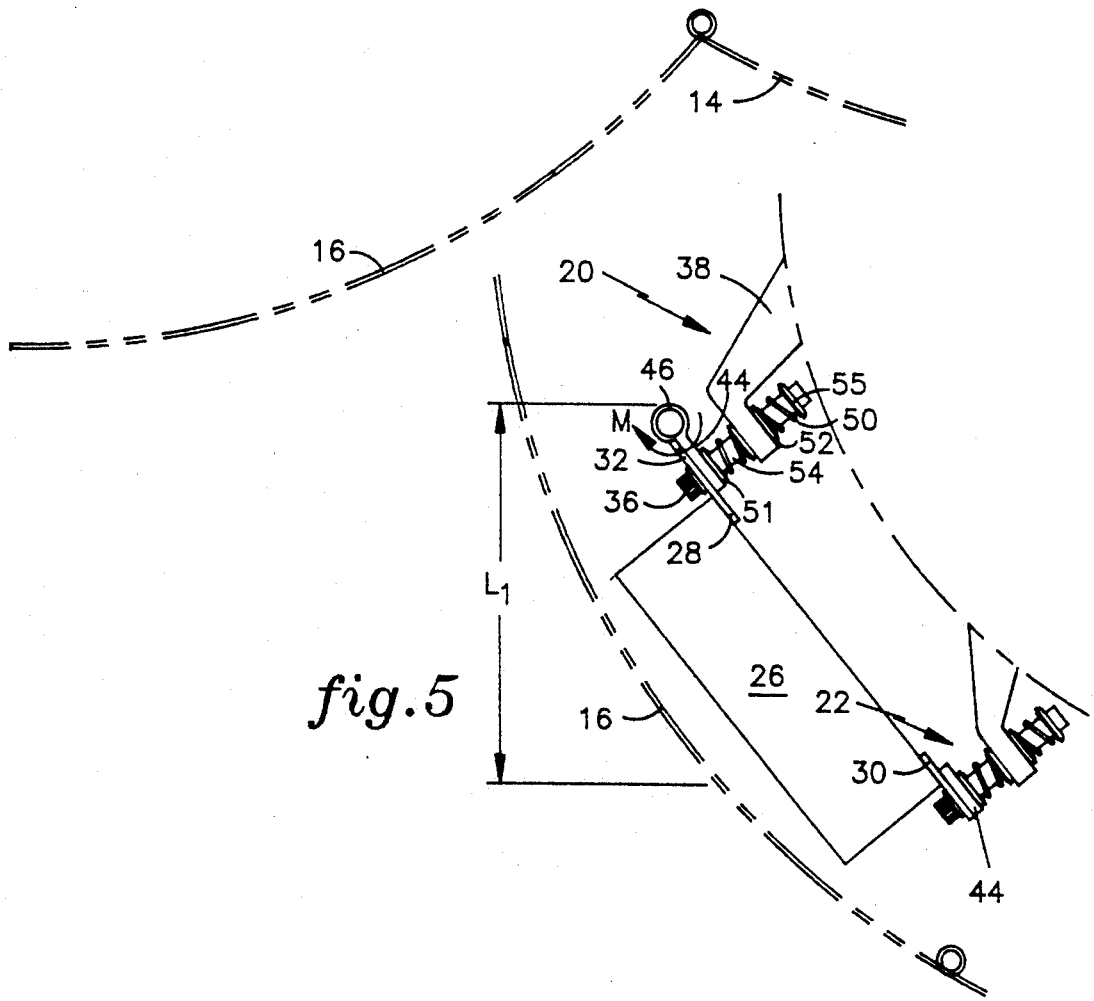

METHOD AND APPARATUS TO INSTALL AND REMOVE HEAVY COMPONENTS

DESCRIPTION

1. Technical Field

The present invention relates to a method and apparatus for manual installation and removal of a heavy component, such as an electronic engine control, to an aircraft engine. Although the invention was developed in the field of aircraft engines it has application to other fields where a heavy component is attached to a base structure.

2. Background Art

Gas turbine engine powerplants used in aircraft applications typically include an engine having an outer casing and a nacelle which extends about the engine. The nacelle is the radially outermost structure. The nacelle is spaced from the engine leaving a nacelle compartment between the casing and nacelle.

One example of such an engine is an axial flow gas turbine engine. A main flow path for working medium gases extends axially through the engine and is bounded by the outer casing. Incoming gases are compressed by a first array of rotating components of the engine. Fuel is added to the gases and the mixture is burned to add energy to the gases. The hot gases are then expanded through another array of rotating components. Operation of the engine causes the engine to radiate heat and to transmit vibrations to the engine casing.

Aircraft engines use externally mounted components, such as electronic engine controls (EEC) and full authority digital engine controls (FADEC), to maintain the operating parameters and send control signals to components of the engine. Each EEC and FADEC has electronic circuitry and components which are sensitive to shock, vibration and heat.

The controls are located in the nacelle compartment and are mounted on a support structure on the outer casing of the engine. Vibration isolators protect the controls from shock or vibration damage. The support structure also spaces the controls away from the engine case to protect the electronic components from the heat generated by the turbine engine. This spacing is limited, however, by the space available within the nacelle compartment.

These engine components require frequent removal and reinstallation for maintenance and repair. The installation and removal procedure is typically performed by a mechanic or a group of mechanics. During removal, the mechanics remove the bolts and manually lift the component away from the engine and through a cowling door located on the nacelle. Installation requires the same procedure in the opposite sequence. The ease of the installation and removal procedure depends on the weight of the component and its location on the engine. Heavy components located below the center line of the engine require the mechanic to support the weight of the component not only during the physical removal of the component, but also during the installation and removal of the support bolts. Additionally, the components are in close proximity to numerous other engine components and are oriented to minimize the intrusion into the nacelle compartment. The difficulties associated with installation and removal of engine components increases the downtime of the engines and also increases the probability of damage to the components and to the engine during installation and removal.

Safety is another aspect of the installation and removal procedure which is of particular concern to the aircraft industry. It is desirable that the procedure provides obvious warning to the mechanic if the installation procedure has not been completed. Ideally, an installation and removal procedure would reduce or eliminate the possibility that one of the steps of the installation is incompletely performed and would decrease the probability of danger or damage to the component or engine.

An improved method of installing and removing heavy electrical components to aircraft engines is disclosed in the commonly owned U.S. Pat. No. 5,031,396, issued to Margnelli, entitled "Premounting Retainer for a Gas Turbine Engine". Margnelli discloses a structure whereby the heavy component has a plurality of pads and the engine casing has a corresponding plurality of externally mounted cups configured to engage the pads. The initial step in the installation procedure requires the mechanic to engage the pads and the cups. The cups will then support the weight of the component while the mechanic installs the bolts. During removal the cups support the weight of the component while the mechanic removes the bolts.

This apparatus has the advantage of removing the weight from the mechanic during bolt installation and removal. However, all the cups and pads must be aligned prior to engaging them. This requires the mechanic to align two planes, one defined by the cups and the other defined by the pads. The orientation of the mounted component, the weight and bulk of the component, and the proximity of other structure in the nacelle compartment can make this extremely difficult in some instances.

The above art notwithstanding, scientists and engineers under the direction of Applicants' Assignee are working to develop procedures which decrease the difficulty and downtime, and improve the safety associated with removal and installation of aircraft engine components.

DISCLOSURE OF INVENTION

An object of the invention is an improved method of installation and removal of heavy components mounted on a base structure.

Another object of the invention is a method of installing and removing components mounted on an aircraft engine casing.

A still further object of the invention is a method of installing components to an aircraft engine which precludes failure to install the required fastener means for the component.

According to the present invention, a method for relatively moving a first element between an installed condition and an uninstalled condition on a second element is comprised of maneuvering the first element and second element between a coupled and uncoupled position, moving the first element relative to the second element about an axis of rotation, and moving a fastener means between a secured and unsecured position.

In accordance with the present invention, an attachment mechanism is comprised of a fastener means and a coupling means comprised of a hook, having an arcuate portion with an opening, and means for rotatably engaging the hook.

According to a specific embodiment of the invention, a method for relatively moving a component between an installed and uninstalled condition on an aircraft engine using a plurality of bolts, the component having a pair of hooks and a plurality of bolt holes, and the engine having a pair of mounting brackets, each bracket comprising a support, a plate with a pin, and a vibration isolator with a threaded socket, is comprised of the following steps: engaging the pair of hooks with the pair of pins; moving the engine component about the axis of the pair of pins; and relative manipulation of the bolts, bolt holes, and threaded sockets.

A principal feature of the present invention is a hook on one of the elements. Another feature is a pin apparatus on the other element which permits rotation and translation of the component, relative to the engine, about an axis defined by the pin. A third feature is a component having a vertical length $L_2$ which is greater than a length $L_1$ defined by the vertical distance from the top of the hook to the surface of a closed cowling door.

An advantage of the present invention is that the mechanic is allowed to bolt the component to the aircraft engine without having to support the bulk of the weight of the unit. In addition, this invention provides a measure of safety during the installation of components mounted below the centerline of the engine. Prior to installation of the support bolts, gravity will urge the component to hang vertically from the pin. Since the component length is greater than the distance from the top of the hook to a closed cowling door, the component will prevent closure of the aircraft engine cowling. Inability to close the cowling door provides an obvious warning to the mechanic of the failure to install the support bolts.

The foregoing and other objects, features and advantages of the present invention become more apparent in light of the following detailed description of the exemplary embodiments thereof, as illustrated in the accompanying drawings.

BRIEF DESCRIPTION OF DRAWINGS

FIG. 1 is an exploded perspective view of an aircraft engine powerplant with a cowling door open and an engine component in an uninstalled position.

FIG. 2 is a view of a hook engaged with a mounting bracket.

FIG. 3 is a view of a hook and bolt fixture.

FIG. 4 is an illustration of an aircraft engine component in an intermediate position with the cowling door open.

FIG. 5 is an illustration of an installed aircraft engine component.

FIG. 6 is a view of an alternative embodiment with a vibration isolator located on the component.

BEST MODE FOR CARRYING OUT THE INVENTION

FIG. 1 is an illustration of an aircraft powerplant 8. The aircraft powerplant 8 includes an aircraft engine 10 having an outer casing 12 and a nacelle 14 having a cowling door 16. The outer casing 12 provides a surface boundary for the internal flow of working fluid and also structural support for an externally mounted engine component 18. The outer casing includes a support means as represented by a pair of upper mounting brackets 20 and a pair of lower mounting brackets 22.

The nacelle 14 is circumferentially offset from the casing 12 and the offset defines a nacelle compartment 24. Various externally mounted engine components, such as control means including an electronic engine control (EEC) and a full authority digital engine control (FADEC), are disposed within the nacelle compartment 24. The cowling door 16 provides access to the nacelle compartment 24 and to the components.

An engine component 18 includes a body 26. Internal to the body 26 may be various electro-mechanical elements (not shown) required for the operation of the engine. The component 18 also includes a pair of upper bolt fixtures 28, having a pair of hooks 32, and a pair of lower bolt fixtures 30. Each of the bolt fixtures 28, 30 has a bolt hole 34 configured for engagement with a fastener means, such as a retaining bolt 36 as illustrated in FIG. 1. The hooks 32 are positioned above the two upper bolt fixtures 28 such that the component 18 will hang substantially vertical when supported by the upper mounting brackets 20.

Referring now to FIGS. 2 and 3, each upper mounting bracket 20 (support means) is comprised of a support 38 having an aperture 40, a vibration isolator 42, and a plate 44 having a pin 46. The support 38 is mounted directly to the engine casing 12 and extends away from the engine 10 to provide clearance for heat dissipation. The vibration isolator 42 is resiliently mounted to the support 38 and the plate 44 is mounted on the vibration isolator 42. The support means has an axis of rotation 48 (shown in FIGS. 1 and 3) for the component 18. The pin is longitudinally aligned and disposed about the axis of rotation 48. The lower mounting brackets 22 are identical to the upper mounting brackets 20 except that no pins are mounted on the lower mounting brackets 22.

The vibration isolator 42 includes a pair of coiled springs 50, an outermost spring retainer cup 51, two central spring retainer cups 52, and a central spool 54 having a bore sized to receive a retainer bolt 36, an innermost spring retainer cup 55, and a threaded socket 56. The threaded socket 56 is disposed on the end furthest from the plate 44. The other end of the spool is threaded and engaged with a threaded aperture 57 (not labeled) of the plate 44 to secure the plate 44 to the spool 54. The spool 54 is also disposed within the aperture 40 of the support 38 in a manner which permits the spool 54 to move longitudinally within the aperture 40. Each spring is disposed about the spool 54 and has one of the retaining cups 52 crimped onto each end. The central spring retainer cups 52 are recessed within the aperture 40 of the support 38 to provide capture of the central spring retainer cups 52 and the springs 50. In an installed condition a retaining bolt 36 passes through the spool 54 and engages the threaded socket 56.

The vibration isolators 42 reduce the amount of vibrational energy transmitted from the aircraft engine 10 to the engine component 18. The amount of energy reduction and the vibrational frequencies affected is dependent on the stiffness of the springs used. Vibration isolators 42 protect the fragile electrical components from the damaging effects of the vibrational energy produced by the engine 10.

Each hook 32 is a simple open hook having a stem portion 60 and an arcuate portion 62. An opening in the arcuate portion permits engagement of the hooks 32 with the pins 46. The arcuate portion 62 has a contact surface 66 along the inner radius of the arcuate portion 62. The contact surface 66 corresponds to the region of contact between the hook 32 and pin 46 during rotation. The contact surface 66 is such that the hook is permitted to rotate about the pin 46 and to slide laterally over the surface of the pin 46. The size of the stem 60 and arcuate portions 62 is dependent upon the weight of the component 18 to be supported. The size of the opening must be large enough to permit the pin 46 to engage the hook 32 but small enough to permit rotation of the component 18 about the pin 46 without the hook 32 becoming disengaged from the pin 46.

The pin 46 and support 38 must be of sufficient size to support a portion of the weight of the component 18. The portion of the weight carried by each pin 46 and support 38 depends on the number and location of the hooks 32 and pins 46.

The interaction of the hooks 32 and pins 46 provides means for coupling the component 18 and engine 10 in a manner which permits relative motion between the engine component 18 and the aircraft engine 10. During installation, the component 18 can be rotated about the axis of rotation 48 to bring the bolt fixtures 28, 30 and mounting brackets 20, 22 into close proximity. From this position, the component 18 may then be translated along the pins to align the bolt holes 34 of the component 18 with the bore and threaded socket 56 of the mounting brackets 20, 22. During removal, the rotational and translational motion assist the mechanic by permitting the component 18 to be moved into a position clear of obstructions prior to the physical removal of the component 18.

As shown in FIG. 1, the aircraft engine 10 is in a non-operational condition. The engine component 18 is in an uninstalled condition and the cowling door 16 is in an open position. In an operational condition, as shown in FIG. 5, the engine component 10 is mounted securely to the mounting brackets 20, 22 with the retaining bolts 36 engaged and the cowling door 16 is in the closed position.

The installation of the engine component 18 to the engine casing 12 is comprised of three simple steps, as illustrated in FIGS. 4 and 5. The first step is to maneuver the engine component 18 into a position which permits the hooks 32 to be engaged with the pins 46 such that the hooks 32 and pins 46 support the weight of the engine component 18 and, for components mounted below the centerline of the engine, the component 18 hangs vertically, as shown in FIG. 4. This is the intermediate position. The second step is to move the component 18 about the pin 46 by rotating and translating, until the bolt holes are aligned with the threaded sockets 56. The third and final step is to manipulate the bolts 36 through the bolt fixtures 28, 30 and into the threaded sockets 56, thereby securing the engine component 18 to the engine casing 12. The component 18 is then in the installed condition. Once the cowling door 16 is closed the aircraft engine 10 is in the operational condition, as shown in FIG. 5.

Although it is not required, it is recommended that the lower bolts, or the bolts furthest from the axis of rotation 48, be installed prior to the upper bolts, or bolts nearest to the axis of rotation 48. As explained below, this will prevent damage to the upper bolts due to overloading in the event that there is a delay in the installation of all the bolts. As the component 18 is rotated towards the engine 10, a moment M (shown in FIG. 5) is created by the weight of the component 18 about the axis of rotation 48. The bolts 36, upon installation, provide a reaction force to both the moment load and the weight load. The lower bolts, being further from the axis of rotation 48 and thus having a longer moment arm, require less strength to counter the moment force of the component 18 than the upper bolts. Therefore, if the lower bolts are always installed first the strength required for the bolts (and the weight) may be reduced.

It is to be noted that when a component mounted below the centerline of the engine is in the intermediate position, a portion of the component 18 penetrates through the opening for the cowling door 16, as shown in FIG. 4. This condition will occur when the vertical length $L_2$ of the component 18 is greater than the distance $L_1$, where $L_1$ is defined as the vertical distance from the top of the hook 32 to the cowling door 16 with the cowling door 16 closed (see FIG. 5). The interference caused by the unbolted component 18 will prevent the cowling door 16 from being closed before the component 18 is properly secured. The open cowling door 16 is an obvious warning that the aircraft engine 10 is not prepared for flight and decreases the probability of operation prior to the proper installation of the component 18.

The removal procedure is essentially the same steps as used in the installation procedure but they are performed in the opposite sequence. The first step is to remove the bolts 36. The second step is to move the engine component 18 into the intermediate position by rotating and translating the hooks about the pins; and the third step is to maneuver the component 18 off the engine 10 by disengaging the hook 32 from the pin 46. As with the installation procedure, it is recommended that the top bolts be removed first thus allowing the load of the component 18 to be distributed between the hooks 32 and lower bolts in the event of a delay in complete removal of the bolts.

In some applications it is possible for the hooks 32 to replace the upper bolts. In this embodiment the hook 32 would not only provide support during the installation procedure but would continue to provide support in the installed condition by sharing the load with the lower bolts. For safety reasons, this embodiment is not recommended for aircraft applications, although it may have several non-aircraft applications.

Although the embodiment illustrated in FIGS. 1 to 5 is shown with two hooks 32, it is possible to practice the invention with a single hook. A drawback to having a single hook, however, is a loss of stability since the component will have an additional degree of freedom in its movement prior to securing the bolts, i.e. the component will be able to revolve about a vertical axis 70 centered on the hook (see FIG. 3). This will require that the mechanic manually restrain the component from revolving about the vertical axis 70. This embodiment may, however, have application if the component is to be mounted to a surface having significant three-dimensional curvature, in which case rotation about a vertical axis may assist in aligning the component with the mounting brackets.

The invention may also be practiced with more than two hooks. A drawback to this embodiment is an increased difficulty of alignment of the hooks and the pins. It is desirable to have the longitudinal axis of each pin parallel with the axis of rotation of the component. In a multi-hook arrangement this may be accomplished by having a single, long pin engaged with all the hooks. Along the same line, it is desirable to have the contact surfaces of the hooks aligned such that, upon engagement of the hooks and pin or pins, the contact point for each hook and pin combination is on an axis parallel with the axis of rotation. The more hooks and pins used, the more difficult these alignments become.

In an alternative embodiment, a vibration isolator 82 is disposed on a component 84 as shown in FIG. 6. In this embodiment the vibration isolator 82 includes a pair of coiled springs 86 and two pair of spring retainer cups 88, one attached to each end of a spring, disposed about a spool 90 having one end 92 attached to a hook plate 94 and the other end attached to one of the retainer cups 88. The spool is slidingly disposed within a component plat form 96 having an apperture 98. A threaded socket 100 and pin platform 102 are mounted directly to a support 104 mounted on the engine casing. In addition, the retainer cup 88 disposed furthest outward of the engine is fixed to the spool 90. This embodiment may be useful for applications in which the vibration isolators cannot be placed on the mounting brackets.

The embodiment illustrated in FIGS. 1-6 discloses a hook disposed on a component and a pin disposed on an engine casing. It should be apparent to those skilled in the art that the location of the hook and pin could be reversed, i.e. the pin may be disposed on the component and the hook may be disposed on the engine casing. In addition, the pin, although shown as cylindrical, could be of any other shape which provides means for rotatable support for the hook and thereby permits relative rotation and translation between the component and engine.

Although the invention has been shown and described with respect with exemplary embodiments thereof, it should be understood by those skilled in the art that various changes, omissions, and additions may be made thereto, without departing from the spirit and scope of the invention.

We claim:

1. A method for relative motion of an aircraft engine component and an aircraft engine between an installed and uninstalled condition, wherein provision is made for means to couple the aircraft engine component and the aircraft engine at a first location, the coupling means permitting relative rotation of the aircraft engine component with respect to the aircraft engine about an axis of rotation and permitting relative translational motion between the aircraft engine component and the aircraft engine about the axis of rotation, and wherein provision is made for a fastener means adapted to secure the aircraft engine component to the aircraft engine, comprising the step of:

maneuvering the aircraft engine component and aircraft engine between a coupled position at which the aircraft engine component engages the aircraft engine at the coupling means and an uncoupled position at which the aircraft engine component is not engaged with the aircraft engine;

moving the aircraft engine component relative to the aircraft engine about the axis of rotation while the aircraft engine component and the aircraft engine are engaged; and relative manipulation of the fastener means between an engaged and disengaged position at a second location.

2. The method according to claim 1, wherein the step of moving the first element relative to the aircraft engine about the axis of rotation includes rotating the aircraft engine component aircraft engine relative to the second about the axis of rotation.

3. The method according to claim 2, wherein the coupling means is comprised of a hook having an arcuate portion with an opening, and a pin adapted to engage the hook through the opening, and wherein the step of maneuvering the aircraft engine component and aircraft engine between a coupled an uncoupled position further comprises maneuvering the hook and pin between an engaged and disengaged position.

4. The method according to claim 3, wherein the hook is disposed on the aircraft engine component and the pin is disposed on the aircraft engine.

5. The method according to claim 4, wherein the fastener means is comprised of a plurality of bolts adapted to engage with the aircraft engine component and the aircraft engine to secure the aircraft engine component tot he aircraft engine, and wherein the step of manipulating the fastener means between an engaged and disengaged position further includes the step of engaging the bolts furthest from the axis of rotation prior to engaging the bolts nearest the axis of rotation, and disengaging the bolts nearest the axis of rotation prior to disengaging the bolts furthest from the axis of rotation.

6. The method according to claim 4, wherein a plurality of hooks are disposed on the aircraft engine component, each of the hooks having a contact surface, the contact surfaces being aligned along a longitudinal axis which is parallel with the axis of rotation, and wherein the step of maneuvering the aircraft engine component and aircraft engine between a coupled and uncoupled position comprises maneuvering the plurality of hooks and the pin between an engaged and disengaged position.

7. The method according to claim 5, wherein a vibration isolator is disposed on the aircraft engine, the isolator adapted to engage the bolts and permit relative motion between the aircraft engine component and aircraft engine in the installed condition, and wherein the step of manipulating the fastener means between an engaged and disengaged position includes a step of engaging and disengaging the bolts and vibration isolator.

8. The method according to claim 5, wherein a vibration isolator is disposed on the aircraft engine component, the vibration isolator adapted to engage the fastener means and permit relative motion between the aircraft engine component and aircraft engine in the installed condition, and wherein the step of manipulating the fastener means between an engaged and disengaged position includes a step of engaging and disengaging the bolts and vibration isolator.

9. The method according to claim 2, wherein the aircraft engine component is a control means, the coupling means is comprised of a hook disposed on the control means and having an arcuate portion with an opening, and a pin disposed on the aircraft engine, the pin adapted to engage the hook through the opening, and wherein the step of maneuvering the control means and aircraft engine between a coupled and uncoupled position further comprises maneuvering the hook and pin between an engaged and disengaged position.

10. The method in accordance with claim 4, wherein the aircraft engine component is mounted below the center line of the aircraft engine such that, with the fastening means disengaged, the aircraft engine component is urged by gravity to rotate about the axis of rotation and away from the aircraft engine, wherein the aircraft engine further comprises a nacelle having a cowling door, and wherein a length $L_1$, defined by the vertical distance from the top of the hook to the cowling door with the cowling door in the closed position, is less than the vertical length $L_2$ of the aircraft engine component.

11. An attachment mechanism for attaching a first element to a second element, wherein the first element is an aircraft engine component and the second element is an aircraft engine, said attachment mechanism comprising:

fastener means adapted to secure the aircraft engine component to the aircraft engine;

an arcuate portion disposed on one of the elements; and means for rotatable support disposed on the other of the elements, said means for rotatable support adapted to engage with said arcuate portion to couple the aircraft engine component and the aircraft engine and to enable translational movement in the engaged position, wherein said attachment mechanism permits relative rotation between the aircraft engine component and the aircraft engine about an axis of rotation and permits relative translational motion between the aircraft engine component and aircraft along the axis of rotation.

12. The attachment mechanism according to claim 11, wherein said arcuate portion is comprised of a hook, said hook having an opening, and wherein said means for rotatable support is adapted to engage with said hook through said opening.

13. The attachment mechanism according to claim 11, wherein said fastener means is comprised of a plurality of threaded bolts, and wherein the first element and the second element are adapted to engage with said bolts.

14. The attachment mechanism according to claim 11, wherein the arcuate portion is comprised of a plurality of hooks, each of said hooks having a contact surface aligned with the contract surfaces of the other of said hooks, and an axis of alignment being parallel with the axis of rotation.

15. The attachment mechanism according to claim 12, wherein said hook is disposed on the aircraft engine component and said means for rotatable support is disposed on the aircraft engine.

16. The attachment mechanism according to claim 13, further comprising a bracket disposed on the aircraft engine, said bracket adapted to engage said bolts, said bracket having a vibration isolator, and wherein said means for rotatable support is disposed on said bracket.

17. The attachment mechanism according to claim 13, further comprising a vibration isolator disposed on the aircraft engine component, said vibration isolator adapted to engage with said bolts.

18. The attachment mechanism according to claim 15, wherein said aircraft engine component is a control means.

19. The attachment mechanism according to claim 11, wherein, said arcuate portion is disposed on the aircraft engine component, said means for rotatable support is disposed on the aircraft engine, further comprising a nacelle disposed outwardly of the aircraft engine and having a cowling door, wherein the aircraft engine component is mounted below the center line of the aircraft engine such that gravity urges the aircraft engine component to rotate away from the engine, and wherein a length $L_1$, defined by the vertical distance from the arcuate portion to the cowling door with the cowling door in the closed position, is less than the vertical length $L_2$ of the aircraft engine component.

20. The attachment mechanism according to claim 15, further comprising a nacelle disposed outwardly of the aircraft engine and having a cowling door, wherein the aircraft engine component is mounted below the center line of the aircraft engine such that gravity urges the aircraft engine component to rotate away from the engine, and wherein a length $L_1$, defined by the vertical distance from the top of the hook to the cowling door with the cowling door in the closed position, is less than the vertical length $L_2$ of the aircraft engine component.

* * * * *